(12) United States Patent
Peters et al.

(10) Patent No.: US 9,938,930 B2
(45) Date of Patent: Apr. 10, 2018

(54) COMPOSITE WEAR PAD FOR EXHAUST NOZZLE

(71) Applicant: United Technologies Corporation, Hartford, CT (US)

(72) Inventors: Donald W. Peters, Colchester, CT (US); Emma J. Place, New Hartford, CT (US)

(73) Assignee: UNITED TECHNOLOGIES CORPORATION, Hartford, CT (US)

(*) Notice: Subject to any disclaimer, the term of this patent is extended or adjusted under 35 U.S.C. 154(b) by 338 days.

(21) Appl. No.: 14/709,072

(22) Filed: May 11, 2015

(65) Prior Publication Data

US 2016/0333725 A1    Nov. 17, 2016

(51) Int. Cl.
| | |
|---|---|
| *F02K 1/80* | (2006.01) |
| *F02K 1/12* | (2006.01) |
| *F01D 25/16* | (2006.01) |
| *F16C 29/00* | (2006.01) |
| *F16C 29/02* | (2006.01) |
| *F16C 33/20* | (2006.01) |

(52) U.S. Cl.
CPC ............. *F02K 1/80* (2013.01); *F01D 25/168* (2013.01); *F02K 1/1223* (2013.01); *F05D 2220/32* (2013.01); *F05D 2240/128* (2013.01); *F05D 2260/231* (2013.01); *F05D 2300/434* (2013.01); *F05D 2300/44* (2013.01); *F05D 2300/603* (2013.01); *F05D 2300/614* (2013.01); *F16C 29/001* (2013.01); *F16C 29/02* (2013.01); *F16C 33/201* (2013.01); *Y02T 50/672* (2013.01)

(58) Field of Classification Search
CPC . F02K 1/80; F02K 1/12; F02K 1/1223; F02K 1/805; F02K 1/763; F02K 1/78; F02K 1/09; F02K 1/08; F02C 7/20; F05D 2230/64; F05D 2260/37; F05D 2260/30; F05D 2300/603
See application file for complete search history.

(56) References Cited

U.S. PATENT DOCUMENTS

| | | |
|---|---|---|
| 2,932,163 A | 4/1960 | Courtney |
| 3,909,481 A | 9/1975 | Pike |

(Continued)

FOREIGN PATENT DOCUMENTS

| | | |
|---|---|---|
| EP | 0091786 | 10/1983 |
| EP | 2365186 | 9/2011 |

OTHER PUBLICATIONS

Extended European Search Report dated Oct. 10, 2016 in European Application No. 16159915.4.

*Primary Examiner* — Andrew Nguyen
(74) *Attorney, Agent, or Firm* — Snell & Wilmer L.L.P.

(57) ABSTRACT

A composite wear pad for being coupled to a slider block of a convergent nozzle of a gas turbine engine includes a high heat capacity composite having a resin and a plurality of carbon fibers bonded together by the resin. The composite wear pad also includes a first rod coupled to the high heat capacity composite at a first axial end of the composite wear pad such that a first end thickness. The composite wear pad also includes a second rod coupled to the high heat capacity composite at a second axial end of the composite wear pad such that the first axial end and the second axial end of the composite wear pad each have an end thickness that is greater than a middle thickness of the composite wear pad.

13 Claims, 6 Drawing Sheets

(56) References Cited

U.S. PATENT DOCUMENTS

| | | | | |
|---|---|---|---|---|
| 4,364,746 | A * | 12/1982 | Bitzer | B24D 3/344 51/296 |
| 4,442,987 | A * | 4/1984 | Legrand | B64D 29/08 239/265.25 |
| 4,815,864 | A | 3/1989 | Jone | |
| 5,239,815 | A | 8/1993 | Barcza | |
| 6,755,727 | B1 * | 6/2004 | Bjerkhoel | B24B 21/04 451/495 |
| 2004/0137834 | A1 * | 7/2004 | Webb | B24D 3/28 451/526 |
| 2008/0038113 | A1 * | 2/2008 | Matsumoto | F01D 5/147 415/209.4 |
| 2010/0193632 | A1 * | 8/2010 | Welch | F02K 1/08 244/110 B |
| 2013/0161415 | A1 * | 6/2013 | Bellanger | F02K 1/72 239/265.19 |
| 2014/0050567 | A1 | 2/2014 | LeBlanc et al. | |

* cited by examiner

COMPOSITE WEAR PAD FOR EXHAUST NOZZLE

GOVERNMENT LICENSE RIGHTS

This disclosure was made with government support under FA 8650-09-D-2923 0021 awarded by The United States Air Force. The government has certain rights in the disclosure.

FIELD

The present disclosure relates generally to convergent nozzles of aircraft and, more particularly, to wear pads positioned between a slider block and a slider track of a convergent nozzle system.

BACKGROUND

Exhaust from turbine sections of gas turbine engines may include uncombusted oxygen. Similarly, if the gas turbine engine is a bypass engine, the bypass air also contains oxygen. Some gas turbine engines may include an augmentor section capable of providing afterburning capabilities. In these gas turbine engines, the exhaust from the turbine section and/or the bypass air may be mixed with additional fuel and combusted in the augmentor section. This secondary combustion further increases the thrust of the gas turbine engine by increasing velocity of the fluid exiting the gas turbine engine. Due to the significant variance in velocity of the exhaust, some of these gas turbine engines may include a variable, or convergent, nozzle capable of changing in dimension based on the velocity of the exhaust fluid. This allows the nozzle to have an optimal shape during afterburning and non-afterburning portions of a flight.

SUMMARY

What is described is a composite wear pad for being coupled to a slider block of a convergent nozzle of a gas turbine engine. The composite wear pad includes a high heat capacity composite having a resin and a plurality of carbon fibers bonded together by the resin. The composite wear pad also includes a first rod coupled to the high heat capacity composite at a first axial end of the composite wear pad such that a first end thickness. The composite wear pad also includes a second rod coupled to the high heat capacity composite at a second axial end of the composite wear pad such that the first axial end and the second axial end of the composite wear pad each have an end thickness that is greater than a middle thickness of the composite wear pad.

Also described is a system. The system includes a slider block configured to slide along a slide track of a convergent nozzle and defining a first slot having a first outer distance and a first inner distance that is greater than the first outer distance. The system also includes a composite wear pad having a first axial end having a first end thickness that is greater than the first outer distance of the slider block such that the composite wear pad resists axial separation in response to the first axial end being positioned within the first slot.

Also described is a system. The system includes a slider block configured to slide along a slide track of a convergent nozzle and defining a first slot and a second slot. The system also includes a composite wear pad that includes a high heat capacity composite having a resin and a plurality of carbon fibers bonded together by the resin. The composite wear pad also includes a first rod coupled to the high heat capacity composite at a first axial end of the composite wear pad such that the first axial end of the composite wear pad can be received by the first slot. The composite wear pad also includes a second rod coupled to the high heat capacity composite at a second axial end of the composite wear pad such that the second axial end of the composite wear pad can be received by the second slot.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
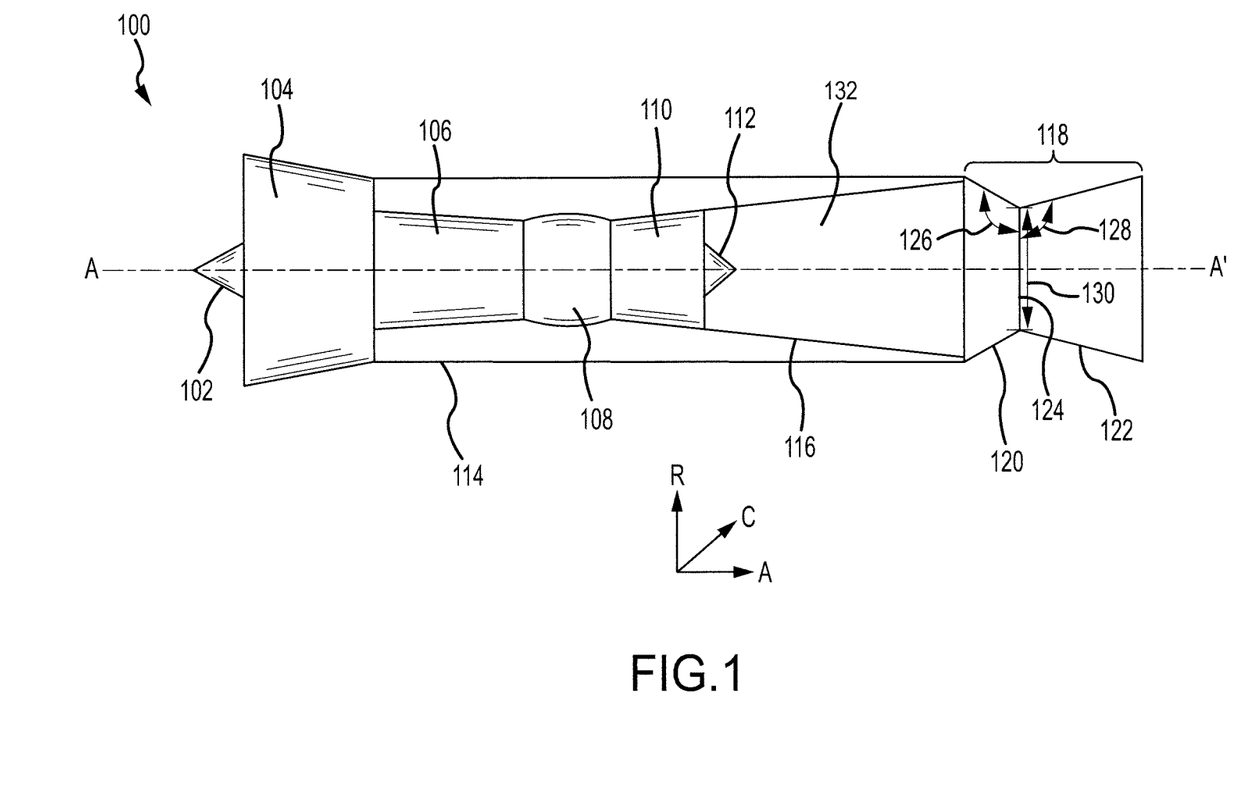
FIG. 1 is a cross-sectional view of an exemplary gas turbine engine having afterburning capabilities, in accordance with various embodiments.

With reference now to FIG. 1, a gas turbine engine 100 is provided. An A-R-C axis is shown throughout the drawings to illustrate the axial (A), radial (R) and circumferential (C) directions. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction.

Gas turbine engine 100 may have afterburning capabilities. In that regard, gas turbine engine 100 may include a nose cone 102, a fan section 104, a compressor section 106, a combustor section 108, a turbine section 110, a tail cone 112, bypass ducts 114, an augmentor section 132, an augmentor liner 116 and a nozzle section 118. Nose cone 102 may improve the aerodynamics of gas turbine engine 100. Nose cone 102 may also provide vibration control functions. Fan section 104 may include a plurality of fan blades that rotate about an axis A-A' of gas turbine engine 100 and propel fluid (such as air) aft. In that regard, a portion of the air is received by compressor section 106 and a portion of the air is received by bypass ducts 114.

The airflow received by compressor section 106 is compressed using a plurality of stages of rotors and stators. The compressed air is then received by combustor section 108 which receives fuel and includes an ignition source. The air and fuel are mixed in combustor section 108 and ignited, creating a flow of exhaust in the aft direction. The exhaust may include compounds created during the ignition and some remaining oxygen that did not react during the combustion.

Turbine section 110 may include multiple stages of blades and vanes. The exhaust created by combustor section 108 is received by turbine section 110. In response to receiving the exhaust, the turbine blades rotate, creating torque. The torque created in turbine section 110 may then be mechanically transferred to fan section 104 in order to cause rotation of the plurality of fan blades and/or compressor section 106 in order to cause rotation of the rotors.

Augmentor liner 116 may include a material defining a plurality of holes such that fluid may pass from one side of augmentor liner 116 to the other side of augmentor liner. In that regard, augmentor section 132 may receive the air flowing through bypass ducts 114. Similarly, the exhaust from turbine section 110 may be received by augmentor section 132.

The exhaust received by augmentor section 132 may have a velocity. In that regard and in various embodiments, the airflow through bypass ducts 114 and the exhaust from turbine section 110 may flow through augmentor section 132 and provide thrust. Augmentor section 132 may include an ignition source and be capable of receiving additional fuel. In response to augmentor section 132 receiving fuel and initiating combustion, the oxygen from the exhaust and the air received via bypass ducts 114 may mix with the fuel and be combusted. This creates a second exhaust having a higher velocity than the velocity of the received exhaust, thus generating more thrust than when combustion is not occurring in augmentor section 132.

Nozzle section 118 may receive air and/or exhaust from augmentor section 132 and may further increase the velocity of the air and/or exhaust. Nozzle section 118 may be a convergent nozzle such that it includes a convergent section 120 and a divergent section 122 that meet at throat 124.

The velocity of exhaust flowing through nozzle section 118 may vary based on whether combustion is occurring in augmentor section 132 or not such that the velocity may be greater if combustion is occurring in augmentor section 132. Accordingly and with reference to FIGS. 1 and 2, a diameter 130 of nozzle section 118 may be selectively altered by changing position of a convergent flap 202 relative to a static structure 200. The diameter 130 may be selectively altered based on the velocity of exhaust flowing through nozzle section 118. This further alters an angle 126 between convergent section 120 and throat 124 as well as an angle 128 between divergent section 122 and throat 124. Nozzle section 118 may thus be changed to provide optimal acceleration of the exhaust based on the velocity of the exhaust.

Figure 2:
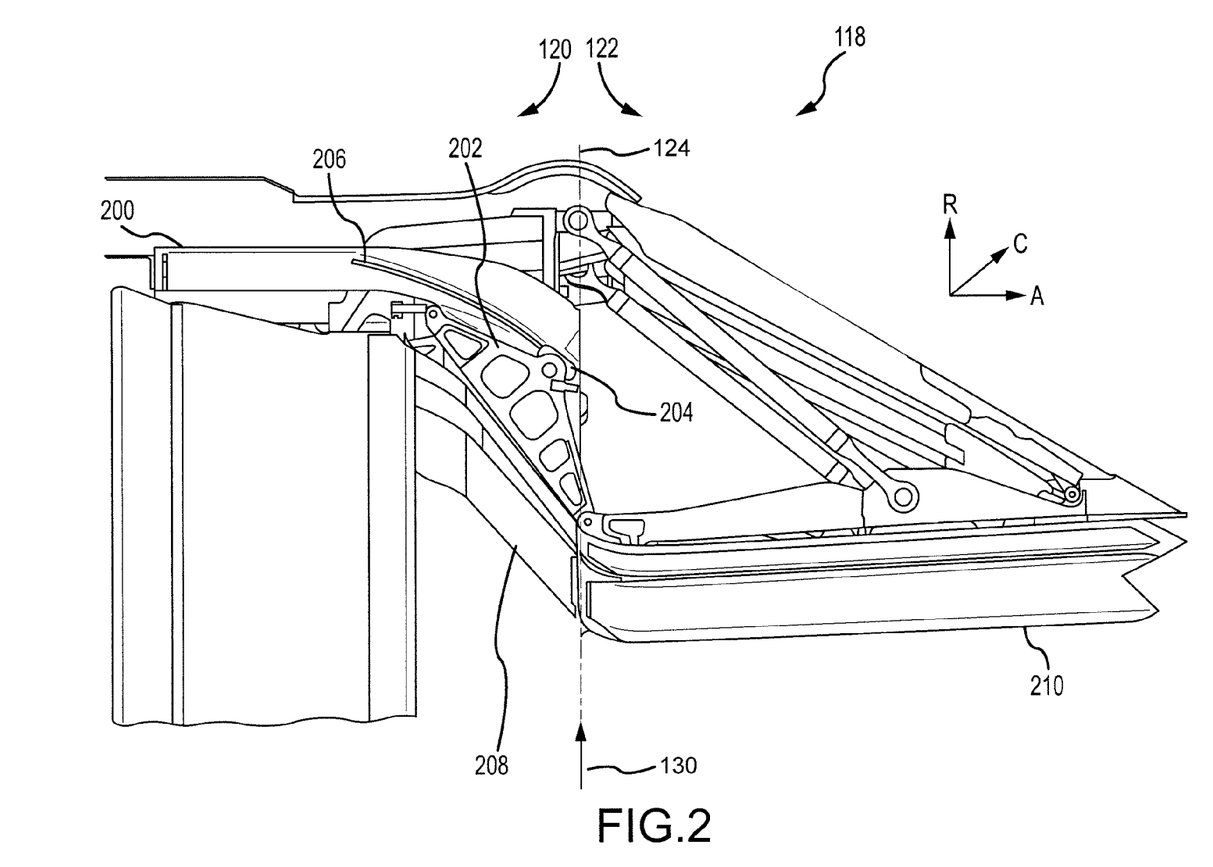
FIG. 2 illustrates a portion of a convergent nozzle of the gas turbine engine of FIG. 1, in accordance with various embodiments.

Static structure 200 may define and/or include a slider track 206. A slider block 204 may be coupled to convergent flap 202 and slider track 206. Slider block 204 may be capable of being received by and slide along slider track 206 and be capable of changing position axially and radially relative to static structure 200. In response to slider block 204 changing position, diameter 130 of throat 124 is increased or decreased. In response to slider block 204 moving aft relative to static structure 200 from a forward position, a forward end of inner surface 210 of divergent section 122 may move radially inward, increasing diameter 130. Similarly, in response to slider block 204 moving forward relative to static structure 200 from an aft position, the forward end of inner surface 210 of divergent section 122 may move radially outward, reducing diameter 130.

Figure 3:
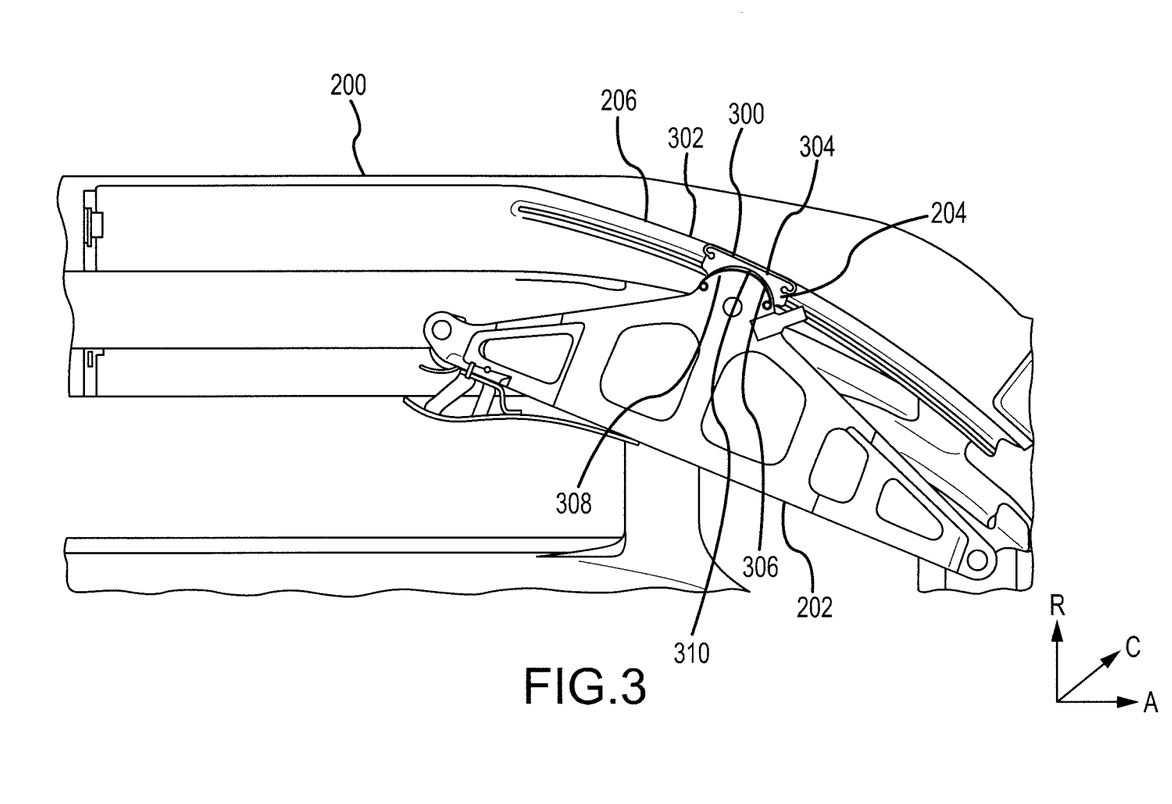
FIG. 3 illustrates a convergent flap coupled to a static structure via a slider block and a slider track, in accordance with various embodiments.

With reference now to FIG. 3, a composite wear pad 300 may be coupled to slider block 204 and positioned between an outer surface 304 of slider block 204 and an outer surface 302 of slider track 206. Similarly, a second composite wear pad 306 may be coupled to slider block 204 and positioned between an outer surface 308 of slider block 204 and an inner surface 310 of slider block 204.

As mentioned above and in various situations, slider block 204 may change position relative to slider track 206. During this motion, friction may occur between outer surface 304 of slider block 204 and outer surface 302 of slider track 206. In a similar manner, convergent flap 202 may change position relative to slider block 204, creating friction between outer surface 308 of convergent flap 202 and inner surface 310 of slider block 204. In that regard, composite wear pad 300 and second composite wear pad 306 may be positioned at these friction points and may resist the friction.

Figure 6:
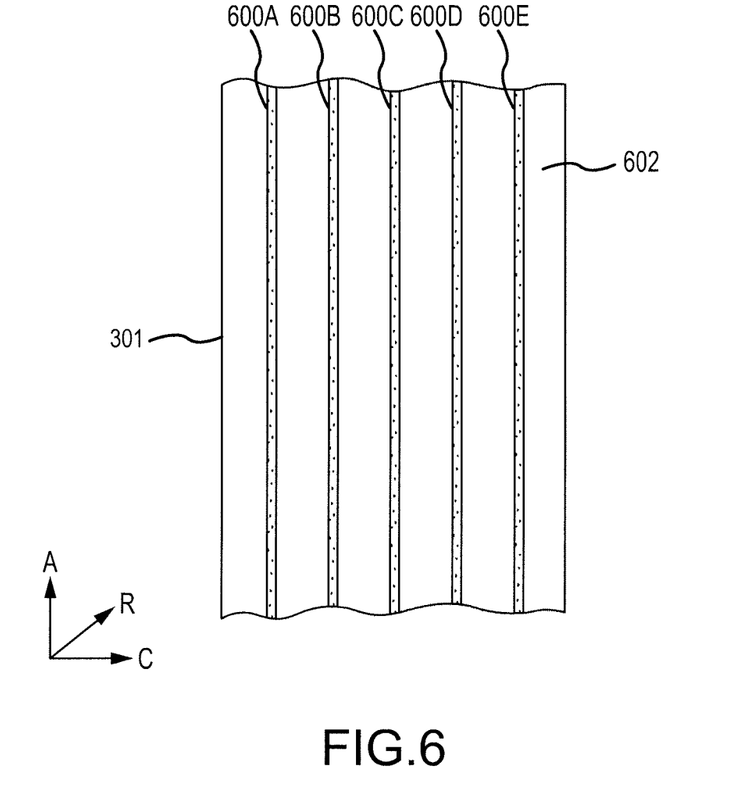
FIG. 6 illustrates a cross-sectional view of the composite wear pad of FIG. 4, in accordance with various embodiments.

With reference now to FIGS. 3 and 6, composite wear pad 300 may include a high heat capacity composite 301 having plurality of carbon fibers 600 bonded using a resin at 602. In various embodiments, plurality of carbon fibers 600 may have some fibers aligned in a first direction and other fibers aligned in a second direction, creating a woven pattern from plurality of carbon fibers 600. In various embodiments, plurality of carbon fibers may all be aligned in the axial direction such that a longitudinal axis of each fiber is parallel to slider track 206 in the axial direction. In various embodiments, resin 602 may include a high temperature thermosetting polyimide resin such as AFR-PE-4™, available from Maverick Corporation of 11359 Grooms Road, Blue Ash, Ohio. Plurality of carbon fibers 600 and resin 602 may be resistant to heat. In various embodiments, the plurality of carbon fibers 600 and resin 602 may be resistant to temperatures up to 250 degrees Celsius (250° C., 482° F.), up to 300° C. (572° F.) or up to 350° C. (662° F.). Second composite wear pad 306 may also include a high heat capacity composite having a plurality of carbon fibers 600 bonded using a resin. In various embodiments, the resin may include a high temperature thermosetting polyimide resin and the plurality of carbon fibers and the resin may be resistant to heat.

Because slider block 204 changes position relative to slider track 206, friction can occur between the two. Thus, composite wear pad 300 may be subjected to friction between the two. The carbon used in plurality of carbon fibers 600 includes friction-based wear resistance, thus, composite wear pad 300 resists wear during use. This results in a longer lifespan of composite wear pad 300 than if it comprised different materials having less wear-resistant properties.

Temperatures near slider block 204 can be relatively high, as hot exhaust flows in close proximity to slider block 204. Because of this, it is undesirable to use grease between slider block 204 and slider track 206. However, the properties of the carbon of plurality of carbon fibers 600 provide a low-friction interface, reducing the need for lubrication. This property reduces an amount of friction between outer surface 304 of slider block 204 and outer surface 302 of slider track 206. This also provides advantages such as reducing or eliminating a requirement for changing grease in this location. Another benefit is the reduction of debris, as grease may attract debris.

Figure 4:
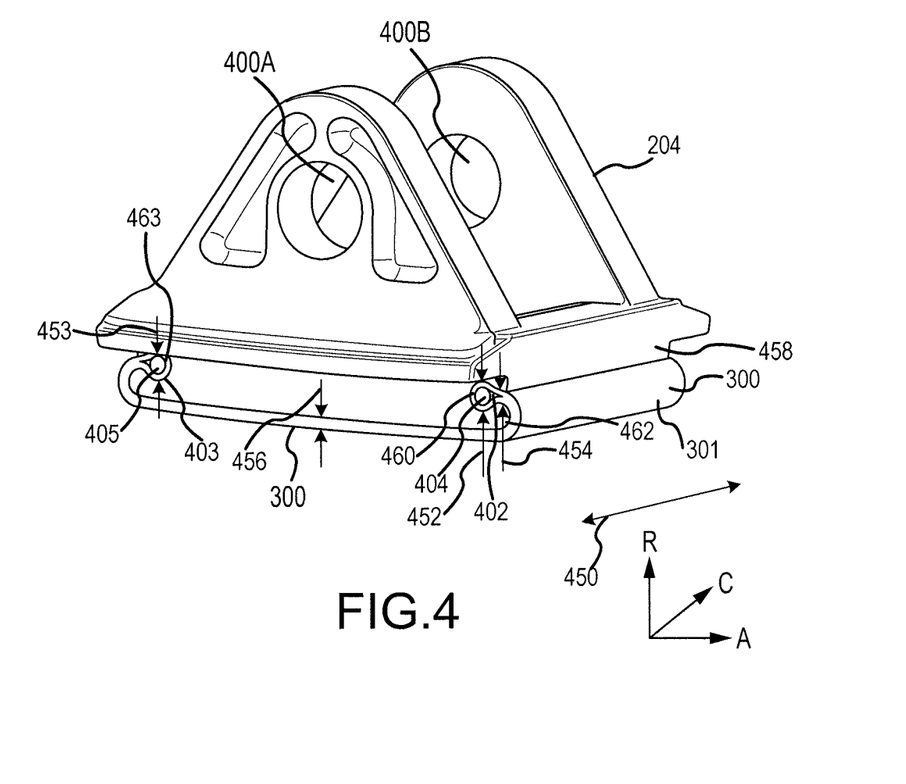
FIG. 4 illustrates the slider block of FIG. 3 coupled to a composite wear pad, in accordance with various embodiments.

With reference now to FIG. 4, slider block 204 may define a first slot 402 and a second slot 403. In various embodiments, high heat capacity composite 301 may circumferentially surround a first rod 404 on a first side of composite wear pad 300 and circumferentially surround a second rod 405 on a second side of composite wear pad 300. In various embodiments, first rod 404 and second rod 405 may have a cylindrical shape such that high heat capacity composite 301 may enclose the curved surface of cylindrical first rod 404 and cylindrical second rod 405. In various embodiments, first rod 404 and second rod 405 may include a metal such as steel, steel alloy, titanium or the like.

During manufacture and after first rod 404 and second rod 405 are circumferentially surrounded by composite wear pad 300, high heat capacity composite 301, first rod 404 and second rod 405 may be co-cured together, for example, using an Autoclave. In various embodiments, the curing may be performed in a high pressure and high temperature environment. In various embodiments, high heat capacity composite 301, first rod 404, second rod 405 and slider block 204 may be cured together. Because first rod 404 and second rod 405 are cured together and used in a relatively high-temperature environment, first rod 404 and second rod 405 may include titanium, as a coefficient of thermal expansion of titanium closely matches that of the material of composite wear pad 300.

High heat capacity composite 301 may have a middle thickness 456 and first axial end 460 and second axial end 463 of composite wear pad 300 may have an end thickness 452. End thickness 452 may be measured as the largest thickness of the portion of composite wear pad 300 including first rod 404 or second rod 405 and may be greater than middle thickness 456. First slot 402 and second slot 403 may have an inner distance 453 and an outer distance 454. Inner distance 453 may be greater than outer distance 454 and positioned axially aft relative to a first axial end 460 of composite wear pad 300. Inner distance 453 may be the same as or slightly greater than end thickness 452 of composite wear pad 300 (i.e., within five percent (5%) or within 10% of end thickness 452). Similarly, outer distance 454 may be the same as or slightly greater than middle thickness 456 (i.e., within 5% or within 10% of middle thickness 456).

Outer distance 454 may be positioned on first axial end 460 above an axial arm 462 of slider block 204. In that regard, first axial end 460 of composite wear pad 300 may be circumferentially aligned with first slot 402 and force may be applied to composite wear pad 300 in the circumferential direction, causing first axial end 460 to slide into first slot 402. Because end thickness 452 is greater than outer distance 454, first axial end 460 may resist separation from slider block 204 in the axial direction. Second axial end 463 of composite wear pad 300 may resist axial separation in the same manner.

Because first rod 404 and second rod 405 are cured with high heat capacity composite 301, the rods resist separation from high heat capacity composite 301. With reference to FIGS. 3 and 4 and based on the shape of annular cavity of first slot 402 and second slot 403, in response to the portions of composite wear pad 300 containing first rod 404 and second rod 405 being inserted into first slot 402 and second slot 403, composite wear pad 300 will resist separation from slider block 204. This is particularly true in response to axial movement of slider block 204 relative to static structure 200. As an additional benefit of coupling composite wear pad 300 to slider block 204 in this manner and returning reference to FIG. 4, in response to replacement of composite wear pad 300 being desired, a new composite wear pad may be coupled to slider block 204 without replacing slider block 204. This is achieved by applying a circumferential force to composite wear pad 300 such that first axial end 460 and second axial end 463 of composite wear pad 300 slide out from first slot 402 and second slot 403.

Figure 5:
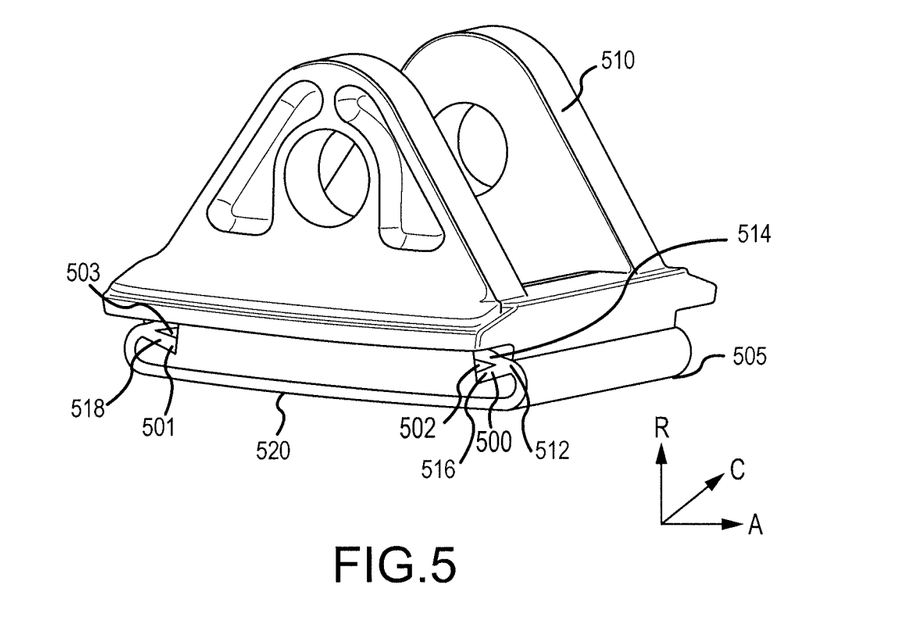
FIG. 5 illustrates a slider block coupled to a composite wear pad, in accordance with various embodiments.

In various embodiments and with reference to FIG. 5, a slider block 510 may define a first triangular slot 500 and a second triangular slot 501, each defining a cavity having a triangular prism shape. Similarly, a composite wear pad 520 may include a high heat capacity composite 505 having a first end 512 coupled to a first triangular rod 502 and a second end 518 coupled to a second triangular rod 503. First end 512 may include a first flap 514 positioned on a base of first triangular rod 502 and another flap 516 positioned on another base of first triangular rod 502. High heat capacity composite 505, first triangular rod 502 and second triangular rod 503 may be co-cured together in order to couple composite wear pad 520 to first triangular rod 502 and second triangular rod 503, such that high heat capacity composite 505, first triangular rod 502 and second triangular rod 503 resist separation. Due to the triangular cavity of first triangular slot 500 and second triangular slot 501, composite wear pad 520 will resist separation from slider block 510.

In various embodiments and with reference to FIGS. 3 and 4, second composite wear pad 306 may include a high heat capacity composite similar to high heat capacity composite 301 and rods similar to first rod 404 and second rod 405 and slider block 204 may include slots similar to first slot 402 and second slot 403. In that regard, second composite wear pad 306 may be coupled to slider block 204 in a similar manner as composite wear pad 300 is coupled to slider block 204.

In various embodiments, the slots of the slider block may have any shape so long as an inner distance of the slot is larger than an outer distance of the slot. A composite wear pad may include a rod having a shape similar to the slots such that in response to a high heat capacity composite being coupled to the rod, the combination of the high heat capacity composite and the rod form a shape that substantially fills a volume defined by the slots (i.e., the volume of the high heat capacity composite coupled to the rod is within 5% or within 10% of the volume defined by a slot) and may not separate from the slots in response to axial movement of the slider block relative to a static structure, due to the end thickness of the rods being larger than the outer distance of the slots.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A system comprising:
   a nozzle section of a gas turbine engine, the nozzle section comprising a convergent flap and a static structure, wherein the static structure comprises a slider track that converges radially inward relative to a central longitudinal axis of the gas turbine engine from forward to aft;
   a slider block coupled to the convergent flap and configured to slide along the slider track of the static structure to change a position of the slider block both axially and radially, wherein the slider block defines a first slot having a first outer distance and a first inner distance that is greater than the first outer distance; and
   a composite wear pad having a first axial end having a first end thickness that is greater than the first outer distance of the slider block such that the composite wear pad resists axial separation in response to the first axial end being positioned within the first slot.

2. The system of claim 1, wherein the composite wear pad further includes a high heat capacity composite having a resin and a plurality of carbon fibers bonded together by the resin.

3. The system of claim 2, wherein the composite wear pad includes a first rod having a cylindrical shape and positioned on the first axial end of the composite wear pad.

4. The system of claim 3, wherein the composite wear pad encloses a curved surface of the first rod.

5. The system of claim 2, wherein the composite wear pad includes a first rod having a triangular prism shape and positioned on the first axial end of the composite wear pad.

6. The system of claim 2, wherein the resin includes a high temperature thermosetting polyimide resin.

7. The system of claim 1, wherein:
   the slider block further defines a second slot having a second outer distance and a second inner distance that is greater than the second outer distance; and
   the composite wear pad further includes a second axial end having a second end thickness that is greater than the second outer distance of the slider block such that the composite wear pad will resist axial separation in response to the second axial end being positioned within the second slot.

8. A system comprising:
   a nozzle section of a gas turbine engine, the nozzle section comprising a convergent flap and a static structure, wherein the static structure comprises a slider track that converges radially inward relative to a central longitudinal axis of the gas turbine engine from forward to aft;
   a slider block coupled to the convergent flap and configured to slide along the slider track of the static structure to change a position of the slider block both axially and radially, wherein the slider block defines a first slot and a second slot; and
   a composite wear pad including:
      a high heat capacity composite having a resin and a plurality of carbon fibers bonded together by the resin,
      a first rod coupled to the high heat capacity composite at a first axial end of the composite wear pad such that the first axial end of the composite wear pad can be received by the first slot, and
      a second rod coupled to the high heat capacity composite at a second axial end of the composite wear pad such that the second axial end of the composite wear pad can be received by the second slot.

9. The system of claim 8, wherein the resin includes a high temperature thermosetting polyimide resin.

10. The system of claim 8, wherein:
    the high heat capacity composite has a middle thickness;
    the first axial end of the composite wear pad has an end thickness; and
    the first slot has an outer distance and an inner distance that is greater than the outer distance such that the first axial end of the composite wear pad will resist axial separation from the slider block in response to the first axial end being positioned within the first slot.

11. The system of claim 8, wherein the first rod and the second rod each have a cylindrical shape.

12. The system of claim 8, wherein the high heat capacity composite surrounds the first rod and the second rod.

13. The system of claim 8, wherein the first rod and the second rod each have a triangular prism shape.

* * * * *